US006771495B2

(12) United States Patent
Fujiwara et al.

(10) Patent No.: US 6,771,495 B2
(45) Date of Patent: Aug. 3, 2004

(54) INFORMATION PROCESSING APPARATUS

(75) Inventors: Norio Fujiwara, Osaka (JP); Yoshihiro Fukukawa, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

(21) Appl. No.: 10/219,551

(22) Filed: Aug. 15, 2002

(65) Prior Publication Data

US 2004/0032710 A1 Feb. 19, 2004

(51) Int. Cl.[7] .................................................. H05K 5/00
(52) U.S. Cl. ....................................... 361/685; 361/683
(58) Field of Search ................................ 361/679, 683, 361/685–688, 704, 707, 709, 711–712, 714; 369/12

(56) References Cited

U.S. PATENT DOCUMENTS 6,501,644 B1 * 12/2002 Silverman et al. .......... 361/685

* cited by examiner

*Primary Examiner*—Darren Schuberg
*Assistant Examiner*—Yean-Hsi Chang
(74) *Attorney, Agent, or Firm*—RatnerPrestia

(57) ABSTRACT

An information processing apparatus includes a shock absorbing structure that dissipates heat generated from function units accommodated in a housing of the apparatus without lowering shock absorbing capacity. A plane-like good heat-conductive member is brought into contact both with the function unit generating heat and a heat conductive element of the apparatus.

9 Claims, 4 Drawing Sheets

4 51 4 31 3 32 2 4 52 4

4 51 2 4 52

INFORMATION PROCESSING APPARATUS

FIELD OF THE INVENTION

The present invention relates to information processing apparatuses such as personal computers, and more particularly it relates to information processing apparatuses accommodating function units that generate heat and need shock resistance.

BACKGROUND OF THE INVENTION

Conventionally, information processing apparatuses including personal computers have accommodated a plurality of function units, e.g., a hard-disc drive (HDD) that is an external storage device, in its housing. A portable information processing apparatus, generally called an A-4 size personal computer, in particular, has prepared a shock absorbing structure for an HDD, which is vulnerable to shocks, in order to have shock resistance.

An information processing apparatus including a conventional housing unit with a shock absorbing structure is described hereinafter with reference to FIG. 4 and FIG. 5. FIG. 4 shows a perspective appearance of an information processing apparatus, and FIG. 5 shows a sectional view of an HDD housing unit. In those drawings, the information processing apparatus includes main housing unit 1 that houses housing section 11 where function units are accommodated. One of the function units is HDD 2, which is completely housed in metal housing 3 made of highly stiff metal such as stainless steel. Metal housing 3 comprises upper case 31 and lower case 32. Shock absorbing member 4, e.g., soft elastomer or spongy urethane, is provided to a space entirely or partially between metal housing 3 and HDD 2. Metal housing 3 is accommodated in housing section 11 within main housing 1 of the information processing apparatus.

When the foregoing conventional portable information processing apparatus receives an external shock during hand-carrying, shock absorbing member 4 absorbs the shock, so that the shock does not travel to HDD2 housed in housing section 11 of main housing 1. As such, accommodation of disc-drive devices, such as HDD 2 vulnerable to shocks, in main housing 1 of the information processing apparatus involves the shock absorbing member.

On the other hand, disc-drive devices, one of the function units, including an HDD generate heat in operation. The heat is desirably dissipated outside in order to prevent the heat from adversely affecting the disc-drive device per se or peripheral electronic components. However, the shock absorbing member has low heat conductivity, thus it is difficult to dissipate efficiently the heat generated from HDD 2 outside the metal housing and further outward. HDD 2 is resultantly suffered from a higher temperature than a specification temperature. In order to overcome this problem, metallic filler is added into shock absorbing member, so that the heat conductivity is increased. This method, however, increases a hardness of the shock absorbing member, thereby lowering shock-absorbing capacity.

Japanese patent application non-examined publication No. 2001-10661 discloses that heat from a CPU of a portable information processing apparatus is dissipated from a display section with a soft heat-conductive member. However, this prior art does not disclose a method of satisfying both of shock absorbing capacity and heat dissipating capacity.

SUMMARY OF THE INVENTION

The present invention addresses the problems discussed above, and aims to provide an information processing apparatus equipped with a shock absorbing structure that can dissipate heat generated from function units housed in a main housing of the information processing apparatus. The information processing apparatus includes a heat conductive element and a plane-like good heat-conductive member that contacts both to the heat conductive element and the function units.

DETAILED DESCRIPTION OF THE EXEMPLARY EMBODIMENTS

Figure 1A:
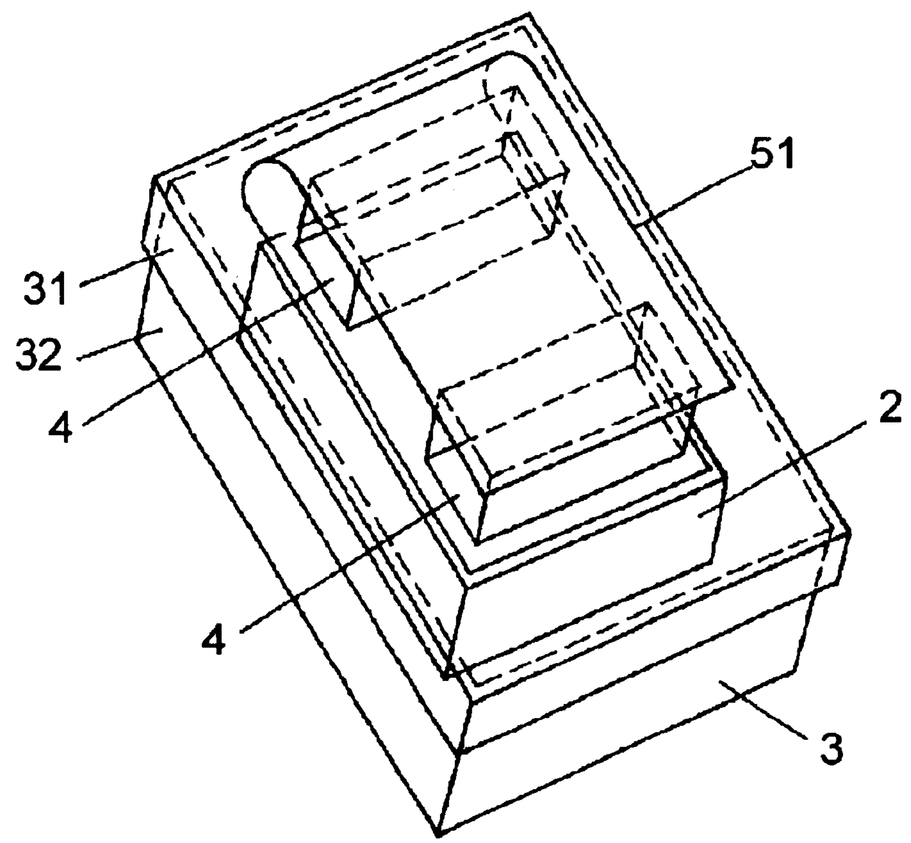
FIG. 1A shows an perspective appearance of an HDD housing which is housed in an information processing apparatus in accordance with a first exemplary embodiment of the present invention.

An information processing apparatus of the present invention includes shock-absorbing means disposed between function units housed in a main housing and the main housing of the apparatus. It also includes a good heat-conductive member between heat conductive elements that are equipped to the function units and the apparatus respectively. The heat conductive elements sandwich the shock-absorbing means. This structure allows the function units to maintain their shock resistance and yet to increase their heat dissipation capacity.

The information processing apparatus of the present invention includes a heat conductive housing which accommodates function units. It also includes a good heat-conductive member between the function units and the heat-conductive housing. The heat-conductive member sandwiches the shock-absorbing means. The heat-conductive housing is housed in the main housing of the apparatus. This structure allows the function units to maintain their shock resistance as well as the heat conductive housing that accommodates the function units to dissipate heat outside.

The information processing apparatus of the present invention includes the main housing made of heat-conductive material, so that heat generated from the function units can be dissipated from the main housing to the outside via the good heat-conductive member.

The main housing of the apparatus of the present invention is made of an alloy of magnesium, so that the main housing is light-weight, highly shock resistant and heat-conductive. As a result, shock resistance capacity and heat dissipation capacity of the housing unit can be increased.

In the information processing apparatus of the present invention, the good heat-conductive member is made of flexible sheet-like, film-like or foil-like material. Those materials hardly affect a shock-absorbing structure, so that the shock resistance capacity of the function units can be maintained and yet heat can be dissipated.

The good heat-conductive member of the information processing apparatus of the present invention is bent into a U-shape, and a first face of the U-shape is brought into contact with a function unit and a second face is brought into contact with the main housing or the heat-conductive housing. This structure allows to increase contact areas with the function unit and the main housing or the heat conductive housing. As a result, conducted heat amount and dissipated heat amount can be increased. Both the first face and the second face can be outer face of the U-shape. Instead, one of the first face and the second face can be outer face of the U-shape and the other face can be inner face of it. And one or two pieces of the U-shaped good heat-conductive member can be used in the information processing apparatus The good heat-conductive member of the information processing apparatus of the present invention forms a step-like shape, and a first face thereof is brought into contact with a function unit and a second face is brought into contact with the main housing or the heat-conductive housing. This structure hardly affects the shock-absorbing structure.

An information processing apparatus of the present invention includes heat-dissipating and shock-absorbing structure, where a good heat-conductive member is fixed to shock-absorbing means. This structure makes it easy to integrate the shock-absorbing means and the good heat-conductive member into a metal housing or a main housing. This structure also allows the shock absorbing capacity and the heat dissipating capacity to be stable.

In the information processing apparatus of the present invention, one of the function units is a disc-drive device, which can advantageously maintain its shock resistance capacity and yet can dissipate heat.

In the information processing apparatus of the present invention, elastomer of highly shock absorptive is used as the shock absorbing means, thereby enhancing the advantage of the present invention.

Exemplary embodiments of the present invention are demonstrated hereinafter with reference to the accompanying drawings.

Exemplary Embodiment 1

Figure 1B:
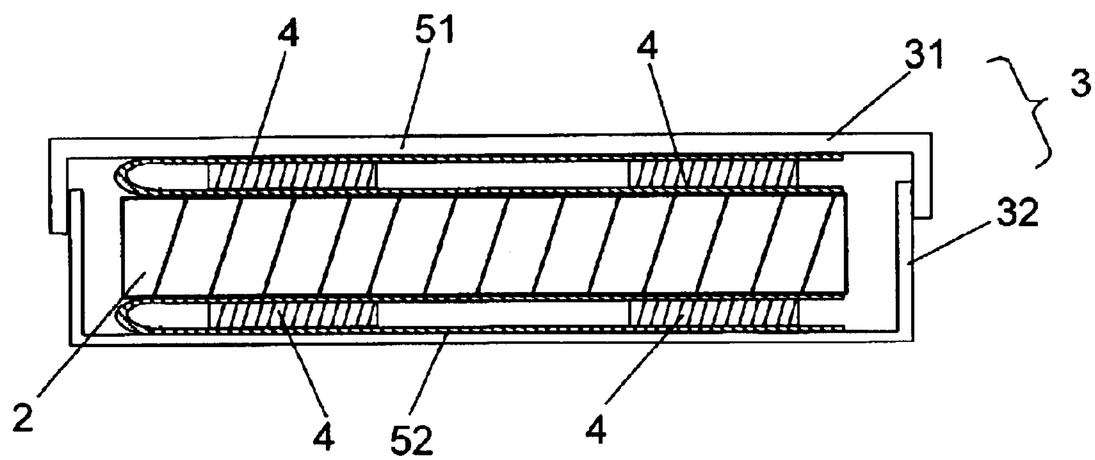
FIG. 1B shows a sectional view of the HDD housing of the first embodiment.

FIG. 1 show an HDD housing which is accommodated in an information processing apparatus in accordance with the first embodiment of the present invention. FIG. 1A shows the perspective appearance and FIG. 1B shows the sectional view. In those drawings, HDD 2 is one of function units and completely housed in metal housing 3 which comprises upper case 31 and lower case 32. Metal housing is made of highly stiff metal such as stainless steel. Shock absorbing member 4 made of, e.g., soft elastomer, is disposed in a space entirely or partially between metal housing 3 and HDD 2. Copper film 51 and 52 of high heat-conductivity are bent to form a U-shape and placed between HDD 2 and shock absorbing member 4 as well as between upper case 31 and shock absorbing member 4, or between lower case 32 and shock absorbing member 4. A thickness of copper film 51,52 ranges approx. from 0.01–0.1 mm (10 $\mu$m–100 $\mu$m). Metal housing 3 including HDD 2 is housed by a main housing (not shown) of the information processing apparatus.

In the foregoing information processing apparatus, heat generated from HDD 2 escapes to upper case 31 via copper film 51 or to lower case 32 via copper film 52. Since copper film 51,52 are so thin as described above that only a little stress due to U-shape bending is produced, which thus hardly affects shock-resistance capacity of HDD 2.

Shock absorbing member 4 is disposed between top face of HDD 2 and upper case 31 as well as between bottom face of HDD 2 and lower case 32, so that shock absorbing member 4 presses strongly copper film 51,52 against case 3. Thus copper film 51,52 are brought into more close contact with HDD 2, upper case 31 or lower case 32, and as a result, heat conductivity between HDD 2 and upper case 31 or lower case 32 increases.

The U-shape bending of film 51,52 enlarges contact areas between HDD 2 and upper case 31 as well as between HDD 2 and lower case 32, thereby increasing heat conducted amount and heat dissipated amount.

Figure 1C:
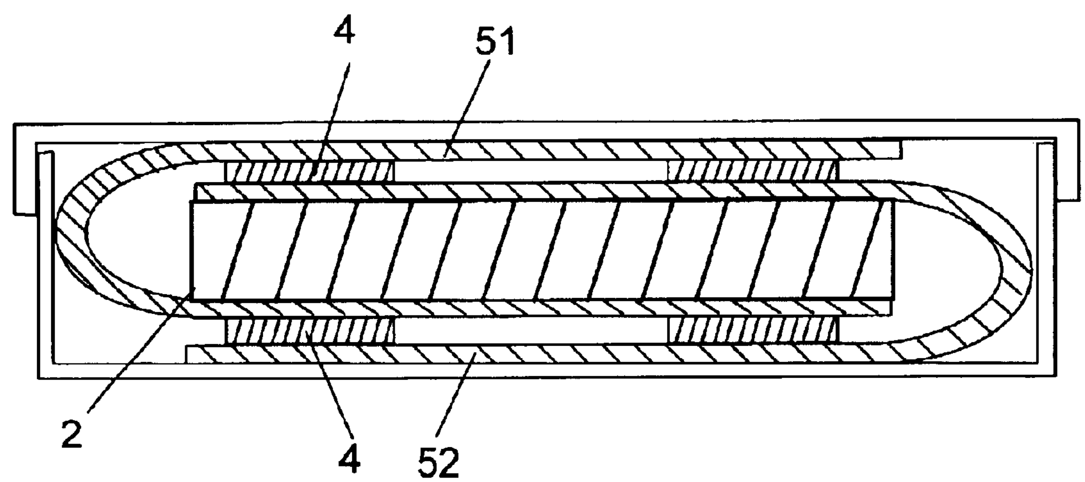
FIG. 1C shows a sectional view of the HDD housing of the first embodiment.

In FIG. 1B, copper film 51 contacts upper case 31 and top face of HDD 2 and copper film 52 contacts lower case 32 and bottom face of HDD 2. In addition to the structure in FIG. 1B, other structures are possible. In FIG. 1C, copper film 51 contacts upper case 31 and bottom face of HDD 2, and copper film 52 contacts lower case 32 and top face of HDD 2 by having each bent section in opposite side.

In FIG. 1B, a length of the upper face and that of the lower face of the U-shape are approx. the same; however, those lengths can be different.

Exemplary Embodiment 2

Figure 2A:
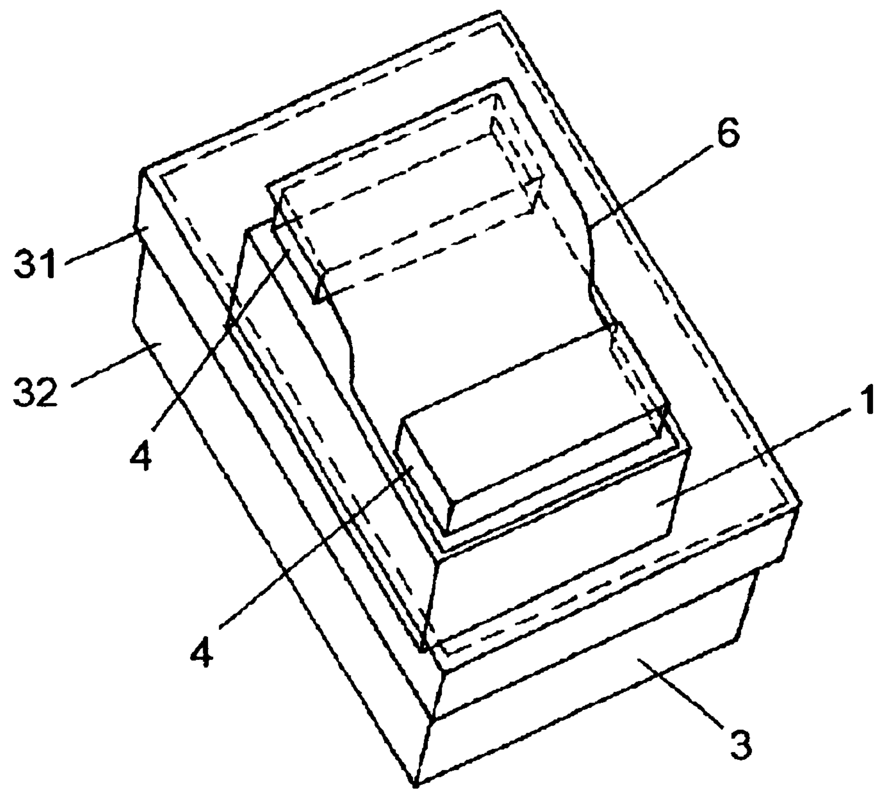
FIG. 2A shows an perspective appearance of an HDD housing which is housed in an information processing apparatus in accordance with a second exemplary embodiment of the present invention.
Figure 2B:
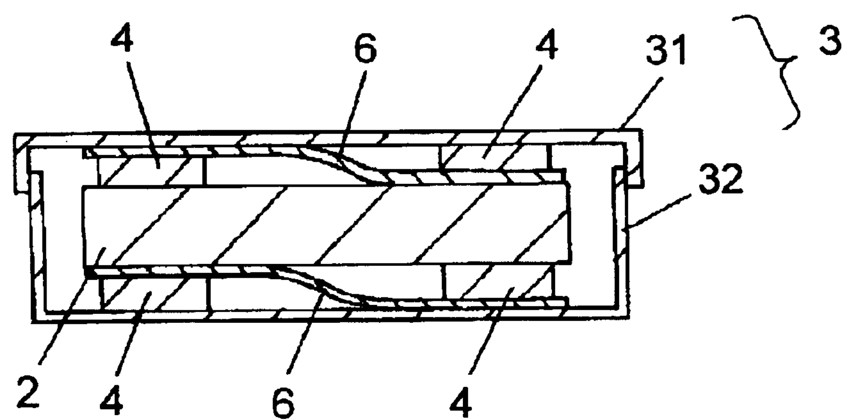
FIG. 2B shows a sectional view of the HDD housing of the second embodiment.

FIG. 2 shows an HDD housing that is accommodated in an information processing apparatus in accordance with the second exemplary embodiment of the present invention. FIG. 2A shows the perspective appearance, and FIG. 2B shows the sectional view. Elements similar to those in the first embodiment have the same reference marks, and the descriptions thereof are omitted here. The second embodiment shown in FIG. 2 differs from the first embodiment in copper film 6 being bent to form a step-like shape having an obtuse angle. Copper film 6 is placed such that a first end thereof is sandwiched between HDD 2 and shock absorbing member 4 and a second end is sandwiched between shock absorbing member 4 and upper case 31 of metal housing 3, or between shock absorbing member 4 and lower case 32.

In the foregoing information processing apparatus, heat generated from HDD 2 escapes to upper case 31 or lower case 32 of metal housing 3 via copper film 6. When the apparatus receives a shock, this structure prevents the external shock from traveling directly to the function unit through the bent section because copper film is bent to form an obtuse-angled step. In other words, the bent copper film hardly affects the shock absorbing structure maintaining the shock resistance capacity of HDD 2, and yet can dissipate heat.

In FIG. 2B, a right and a left lengths from the bent section are approx. the same, however, the lengths can be different.

Exemplary Embodiment 3

Figure 3:
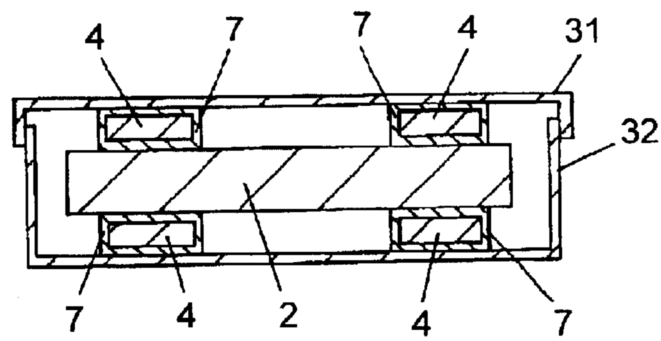
FIG. 3 shows a sectional view of an HDD housing in accordance with a third exemplary embodiment of the present invention.
Figure 4:
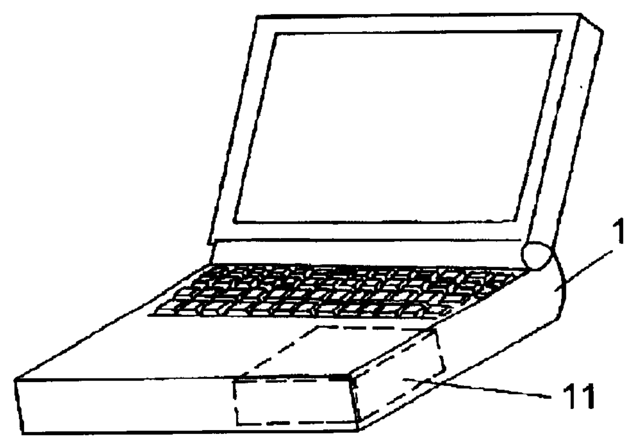
FIG. 4 shows a perspective appearance of an information processing apparatus.
Figure 5:
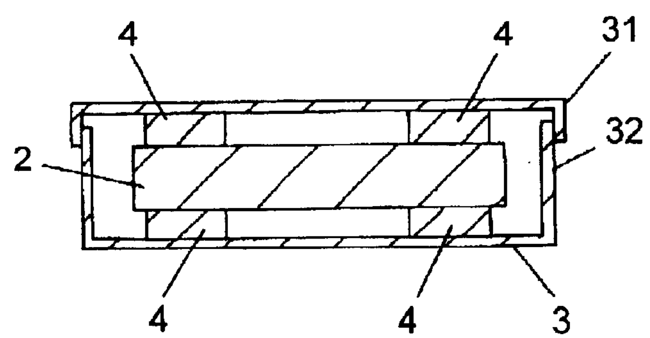
FIG. 5 shows a sectional view of an HDD housing of an information processing apparatus that includes a shock absorbing structure of a conventional housing unit.

FIG. 3 shows a sectional view of an HDD housing that is accommodated in an information processing apparatus in accordance with the third exemplary embodiment of the present invention. Elements similar to those in the first embodiment have the same reference marks, and the descriptions thereof are omitted here. The third embodiment shown in FIG. 3 differs from the first embodiment in using copper foil instead of copper film. In this embodiment, copper foil 7 of several micrometers thick is stuck on shock absorbing member 4 by plating or the like.

When the apparatus receives a shock, this structure allows HDD 2 to maintain the shock resistance capacity and yet to dissipate heat because copper foil is so thin that little stress is produced, which hardly affects the shock resistance structure.

In the embodiments previously discussed, copper film is used as a good heat-conductive member; however, a highly heat-conductive material such as aluminum, sheet-like graphite or the like can be used instead. Soft elastomer used as a shock absorbing member can enhance the advantage of the present invention because of its high shock-absorption; however, materials that can absorb shocks can be also used, such as spongy urethane foam, spongy polyvinyl chloride foam and the like.

Heat dissipates from an upper face of HDD 2 and travels to upper case 31 of metal housing 3, and heat dissipates from a lower face of HDD 2 and travels to lower case 32 of metal housing 3. However, if the heat dissipation from either one of the faces lowers the temperature of HDD 2 to lower enough for satisfying the specification, heat dissipation measures can be provided to only one of the faces.

In the previous embodiments, heat dissipates from the metal housing; however, in the case that an HDD is integrated into a portable information processing apparatus such as an A4-size personal computer, if a housing of the apparatus is made of metal such as an alloy of magnesium, or if highly heat-conductive material is disposed closely to the HDD, the copper film is brought into direct contact with these materials, so that the metal housing can be omitted.

In the first or second embodiment, if the copper film is fixed to the shock absorbing member by depositing or bonding, the HDD and the shock absorbing member can be integrated into the metal housing or the main housing with ease, and the shock absorbing capacity as well as heat dissipating capacity becomes stable. If a poor heat-conductive adhesive is used, an adhesive applied area is desirably minimized so as not to block the heat conduction between the good heat-conductive member and the function unit or the heat-conductive element.

In the previous embodiments, an HDD is taken as an example of the function unit; however, any function unit, such as a disc-drive device, vulnerable to shocks and generating heat can applicable to the present invention.

According to the present invention, a good heat-conductive member sandwiching shock absorbing means is disposed between a main housing of an information processing apparatus or a heat-conductive housing and a function unit. This structure can maintain the shock absorbing capacity while it dissipates heat from the function unit accommodated in the main housing.

What is claimed is:

1. An information processing apparatus comprising:

a main housing;

a function unit accommodated in said main housing;

a shock absorbing member disposed between said main housing and said function unit;

a heat conductive element;

a plane-like good heat-conductive member of which first part is brought into contact with said function unit and a second part is brought into contact with said heat conductive element, said plane-like good heat-conductive member being disposed along an outer face of said shock absorbing member wherein said heat conductive element is a heat conductive housing to be accommodated in said main housing;

wherein said function unit is housed in the heat conductive housing, and said shock absorbing member is disposed between the heat conductive housing and said function unit, wherein the first part of said good heat-conductive member is brought into contact with said function unit and the second part thereof is brought into contact with the heat conductive housing, and wherein said good heat-conductive member is bent into a U-shape, and a first face of the U-shape is brought into contact with said function unit and a second face of the U-shape is brought into contact with the heat conductive housing.

2. The information processing apparatus of claim 1, wherein the first face is the first outer face of the U-shape and the second face is the second outer face of the U-shape.

3. An information processing apparatus comprising:

a main housing;

a function unit accommodated in said main housing;

a shock absorbing member disposed between said main housing and said function unit;

a heat conductive element;

a plane-like good heat-conductive member of which first part is brought into contact with said function unit and a second part is brought into contact with said heat conductive element, said plane-like good heat-conductive member being disposed along an outer face of said shock absorbing member;

wherein said heat conductive element is a heat conductive housing to be accommodated in said main housing;

wherein said function unit is housed in the heat conductive housing, and said shock absorbing member is disposed between the heat conductive housing and said function unit, wherein the first part of said good heat-conductive member is brought into contact with said function unit and the second part thereof is brought into contact with the heat conductive housing, wherein said good heat-conductive member has a step-like bent section, a first flat part and a second flat part partitioned by the bent section, and wherein a face of the first flat part is brought into contact with said function unit, and another face of the second flat part is brought into contact with the heat conductive housing.

4. An information processing apparatus comprising:

a main housing;

a function unit accommodated in said main housing;

a shock absorbing member disposed between said main housing and said function unit;

a heat conductive element;

a plane-like good heat-conductive member of which first part is brought into contact with said function unit and a second part is brought into contact with said heat conductive element, said plane-like good heat-conductive member being disposed along an outer face of said shock absorbing member wherein said heat conductive element is a heat conductive housing to be accommodated in said main housing;

wherein said function unit is housed in the heat conductive housing, and said shock absorbing member is disposed between the heat conductive housing and said function unit, wherein the first part of said good heat-conductive member is brought into contact with said function unit and the second part thereof is brought into contact with the heat conductive housing, wherein said good heat-conductive member surrounds said shock absorbing member, and wherein a first face of said shock absorbing member is brought into contact with said function unit via said good heat-conductive member, and a second face of said shock absorbing member is brought into contact with the heat conductive housing via said good heat-conductive member.

5. The information processing apparatus of claim 4, wherein said good heat-conductive member surrounds said shock absorbing member, wherein a first face of said shock absorbing member is brought into contact with said function unit via said good heat-conductive member, and a second face of said shock absorbing member is brought into contact with said main housing via said good heat-conductive member.

6. An information processing apparatus comprising:

a main housing;

a function unit accommodated in said main housing;

a shock absorbing member disposed between said main housing and said function unit;

a heat conductive element;

a plane-like good heat-conductive member of which first part is brought into contact with said function unit and a second part is brought into contact with said heat conductive element, said plane-like good heat-conductive member being disposed along an outer face of said shock absorbing member, wherein said heat conductive element is said main housing made of heat conductive material, wherein a first part of said good heat-conductive member is brought into contact with said function unit and a second part thereof is brought into contact with said main housing, and wherein said good heat-conductive member is bent into a U-shape, and a first face of the U-shape is brought into contact with said function unit and a second face of the U-shape is brought into contact with said main housing.

7. The information processing apparatus of claim 6, wherein the first face is the first outer face of the U-shape and the second face is the second outer face of the U-shape.

8. An information processing apparatus comprising:

a main housing;

a function unit accommodated in said main housing;

a shock absorbing member disposed between said main housing and said function unit;

a heat conductive element;

a plane-like good heat-conductive member of which first part is brought into contact with said function unit and a second part is brought into contact with said heat conductive element, said plane-like good heat-conductive member being disposed along an outer face of said shock absorbing member;

wherein said heat conductive element is said main housing made of heat conductive material;

wherein a first part of said good heat-conductive member is brought into contact with said function unit and a second part thereof is brought into contact with said main housing;

wherein said good heat-conductive member has a step-like bent section, a first flat part and a second flat part partitioned by the bent section, wherein a face of the first flat part is brought into contact with said function unit, and another face of the second flat part is brought into contact with said main housing.

9. An information processing apparatus comprising:

a main housing;

a function unit accommodated in said main housing;

a shock absorbing member disposed between said main housing and said function unit;

a heat conductive element;

a plane-like good heat-conductive member of which first part is brought into contact with said function unit and a second part is brought into contact with said heat conductive element, said plane-like good heat-conductive member being disposed along an outer face of said shock absorbing member, wherein said good heat-conductive member is fixed to said shock absorbing member.

* * * * *

UNITED STATES PATENT AND TRADEMARK OFFICE

CERTIFICATE OF CORRECTION

PATENT NO. : 6,771,495 B2
DATED : August 3, 2004
INVENTOR(S) : Fujiwara et al.

It is certified that error appears in the above-identified patent and that said Letters Patent is hereby corrected as shown below:

Title page,
Insert Item -- [30] Foreign Application Priority Data
May 24, 2001 (JP) 2001-154957 --.

Signed and Sealed this

Fourteenth Day of December, 2004

JON W. DUDAS
*Director of the United States Patent and Trademark Office*